US012720521B2

(12) United States Patent
Yeh

(10) Patent No.: US 12,720,521 B2
(45) Date of Patent: Aug. 25, 2026

(54) METHOD FOR ESTABLISHING A COMMUNICATION GROUP USING A TARGET CHANNEL, COMMUNICATION DEVICE, AND COMPUTER READABLE STORAGE MEDIUM

(71) Applicant: HTC Corporation, Taoyuan City (TW)

(72) Inventor: Hung-Ching Yeh, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 325 days.

(21) Appl. No.: 18/413,069

(22) Filed: Jan. 16, 2024

(65) Prior Publication Data

US 2025/0097932 A1 Mar. 20, 2025

Related U.S. Application Data

(60) Provisional application No. 63/539,332, filed on Sep. 20, 2023.

(51) Int. Cl.
*H04W 72/121* (2023.01)
*H04W 72/542* (2023.01)

(52) U.S. Cl.
CPC ....... *H04W 72/121* (2013.01); *H04W 72/542* (2023.01)

(58) Field of Classification Search
CPC ... H04W 72/121; H04W 72/542; H04W 4/08; H04W 4/80; H04W 76/14; H04W 84/18; H04W 48/18; H04W 48/10
See application file for complete search history.

(56) References Cited

U.S. PATENT DOCUMENTS

| | | | | |
|---|---|---|---|---|
| 10,003,642 | B2 * | 6/2018 | Vandwalle .......... | H04W 56/002 |
| 2015/0006633 | A1 | 1/2015 | Vandwalle et al. | |
| 2017/0331670 | A1 * | 11/2017 | Parkvall .............. | H04L 41/0233 |
| 2018/0167965 | A1 * | 6/2018 | Wang .................... | H04L 5/0044 |
| 2019/0239118 | A1 * | 8/2019 | Baghel .................. | H04L 5/0053 |
| 2022/0394428 | A1 * | 12/2022 | Movva .................. | H04W 4/029 |

FOREIGN PATENT DOCUMENTS

| | | |
|---|---|---|
| CN | 109923900 | 6/2019 |

OTHER PUBLICATIONS

"Search Report of European Counterpart Application", issued on Oct. 14, 2024 , p. 1-p. 5.
"Office Action of Taiwan Counterpart Application", issued on Jul. 15, 2025, p. 1-p. 7.

* cited by examiner

*Primary Examiner* — Mewale A Ambaye
(74) *Attorney, Agent, or Firm* — JCIPRNET

(57) ABSTRACT

The embodiments of the disclosure provide a method for establishing a communication group, a communication device, and a computer readable storage medium. The method includes: receiving at least one beacon from at least one reference device, wherein each beacon includes a wireless channel used by the corresponding reference device and a number of connected devices of the corresponding reference device, and the wireless channel indicated in each beacon belongs to multiple reference channels; determining a target channel based on the wireless channel used by the corresponding reference device and the number of connected devices of the corresponding reference device; and establishing the communication group by using the target channel.

18 Claims, 4 Drawing Sheets

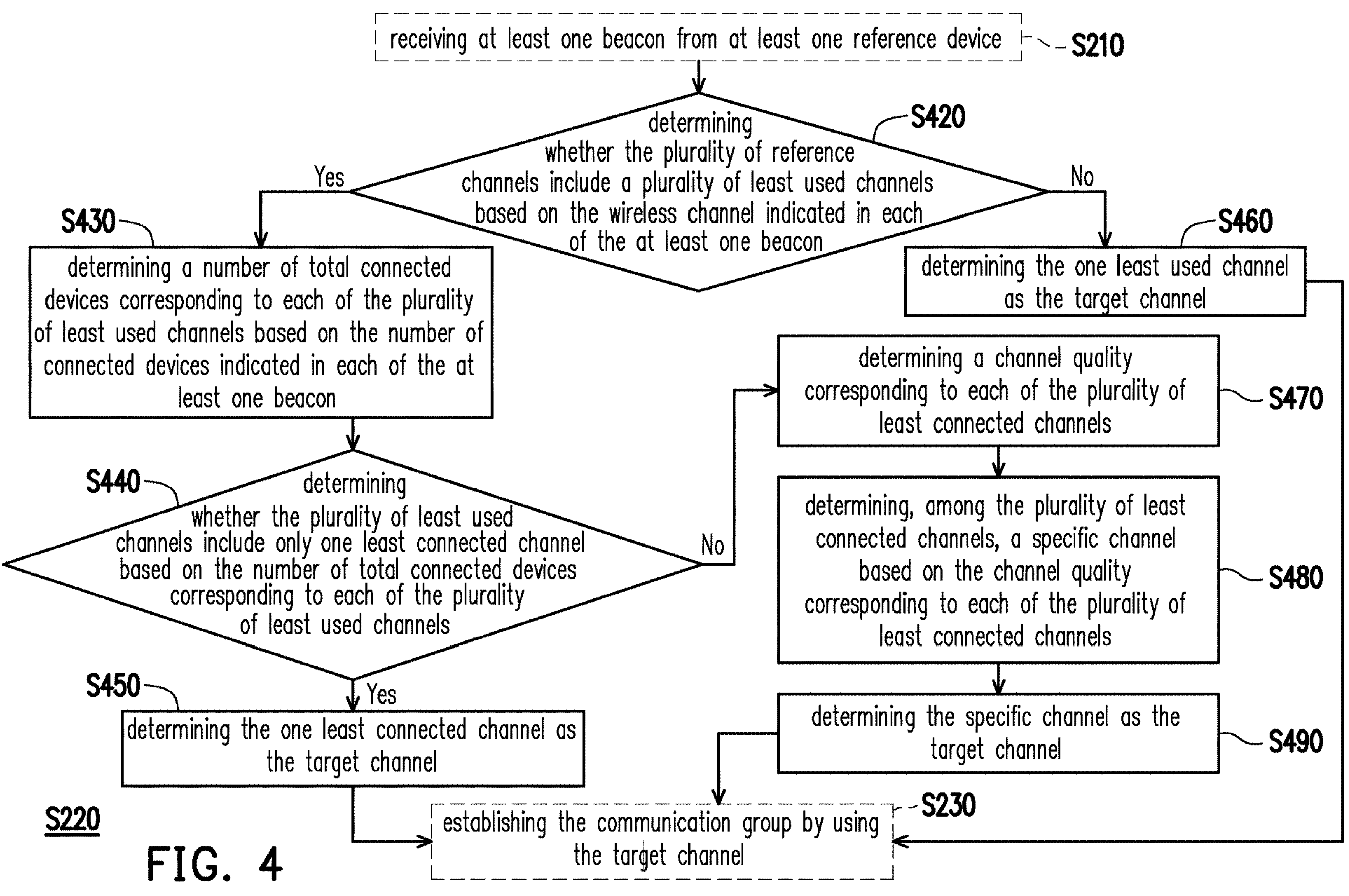
receiving at least one beacon from at least one reference device
S210
determining whether the plurality of reference channels include a plurality of least used channels based on the wireless channel indicated in each of the at least one beacon
S420
Yes
No
S430
determining a number of total connected devices corresponding to each of the plurality of least used channels based on the number of connected devices indicated in each of the at least one beacon
S460
determining the one least used channel as the target channel
determining a channel quality corresponding to each of the plurality of least connected channels
S470
S440
determining whether the plurality of least used channels include only one least connected channel based on the number of total connected devices corresponding to each of the plurality of least used channels
No
determining, among the plurality of least connected channels, a specific channel based on the channel quality corresponding to each of the plurality of least connected channels
S480
S450
Yes
determining the one least connected channel as the target channel
determining the specific channel as the target channel
S490
S220
establishing the communication group by using the target channel
S230
FIG. 4

METHOD FOR ESTABLISHING A COMMUNICATION GROUP USING A TARGET CHANNEL, COMMUNICATION DEVICE, AND COMPUTER READABLE STORAGE MEDIUM

CROSS-REFERENCE TO RELATED APPLICATION

This application claims the priority benefit of U.S. provisional application Ser. No. 63/539,332, filed on Sep. 20, 2023. The entirety of the above-mentioned patent application is hereby incorporated by reference herein and made a part of this specification.

BACKGROUND

1. Field of the Invention

The present disclosure generally relates to a communication mechanism, in particular, to a method for establishing a communication group, a communication device, and a computer readable storage medium.

2. Description of Related Art

With the increasing popularity of virtual reality (VR) Wi-Fi accessories, achieving optimal Wi-Fi throughput is crucial for performance. When a Head-Mounted Display (HMD) establishes a private Wi-Fi Peer-to-Peer (P2P) group to facilitate the transmission of VR traffic among multiple VR accessories, the careful selection of a radio frequency (RF) channel becomes paramount.

Therefore, it is crucial to design a mechanism to properly choose a channel with lower usage by others to prevent Wi-Fi signal collisions and to achieve improved Wi-Fi throughput.

SUMMARY OF THE INVENTION

Accordingly, the disclosure is directed to a method for establishing a communication group, a communication device, and a computer readable storage medium, which may be used to solve the above technical problems.

The embodiments of the disclosure provide a method for establishing a communication group, applied to a communication device. The method includes: receiving, by the communication device, at least one beacon from at least one reference device, wherein each of the at least one beacon includes a wireless channel used by the corresponding reference device and a number of connected devices of the corresponding reference device, and the wireless channel indicated in each of the at least one beacon belongs to a plurality of reference channels; determining, by the communication device, a target channel based on the wireless channel used by the corresponding reference device and the number of connected devices of the corresponding reference device; and establishing, by the communication device, the communication group by using the target channel.

The embodiments of the disclosure provide a communication device including a transceiver and a processor. The processor is coupled to the transceiver and performs: controlling the transceiver to receive at least one beacon from at least one reference device, wherein each of the at least one beacon includes a wireless channel used by the corresponding reference device and a number of connected devices of the corresponding reference device, and the wireless channel indicated in each of the at least one beacon belongs to a plurality of reference channels; determining a target channel based on the wireless channel used by the corresponding reference device and the number of connected devices of the corresponding reference device; and establishing the communication group by using the target channel.

The embodiments of the disclosure provide a non-transitory computer readable storage medium, the computer readable storage medium recording an executable computer program, the executable computer program being loaded by a communication device to perform steps of: receiving at least one beacon from at least one reference device, wherein each of the at least one beacon includes a wireless channel used by the corresponding reference device and a number of connected devices of the corresponding reference device, and the wireless channel indicated in each of the at least one beacon belongs to a plurality of reference channels; determining a target channel based on the wireless channel used by the corresponding reference device and the number of connected devices of the corresponding reference device; and establishing the communication group by using the target channel.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

FIG. 4 shows a flow chart of determining a target channel according to an embodiment of the disclosure.

DESCRIPTION OF THE EMBODIMENTS

Figure 1:
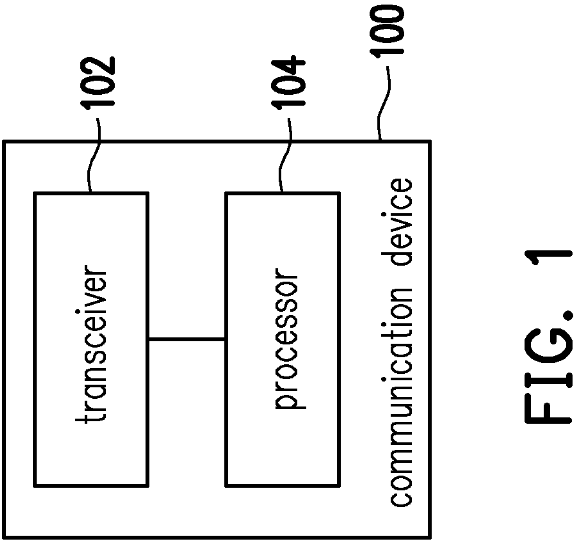
FIG. 1 shows a functional block diagram of communication device according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a functional block diagram of communication device according to an embodiment of the disclosure. In various embodiments, the communication device 100 can be any device configured with communication functions, such as a computer device and/or a smart device.

In FIG. 1, the communication device 100 includes a transceiver 102 and a processor 104. The transceiver 102 may be configured for transmitting and receiving signals from other devices within a coverage area thereof. The transceiver 102 is capable of performing analog to digital signal conversion (ADC), digital to analog signal conversion (DAC), modulation, demodulation, signal amplification, low-pass filtering, and bandpass filtering. For example, the transceiver 102 is configured to provide information on a received signal to the processor 104, modulating data received from the processor 104 into a modulated signal, and transmitting the modulated signal to other devices.

In some embodiments, the communication device 100 may further include other elements, such as an antenna module for implementing the aforementioned functions of the transceiver 102 and the processor 104.

The processor 104 may be coupled with the transceiver 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In some embodiments, the communication device 100 may be capable of establishing a communication group (e.g., a private P2P group) based on communication protocols such as Bluetooth and/or Wi-Fi, but the disclosure is not limited thereto. In some embodiments, the communication device 100 may be connected with one or more peripheral device and/or accessory device, and these peripheral devices and/or accessory devices can communicate with the communication device 100 as connected devices of the communication group.

In some embodiments, the communication device 100 may be an HMD, and the corresponding peripheral device and/or accessory device can be, for example, handheld controllers, wearable devices, or other devices that can be used by the user to interact with the visual content provided by the HMD, but the disclosure is not limited thereto.

In different embodiments, the HMD may be used to provide reality services such as VR service, augmented reality (AR) service, mixed reality (MR) service, or the like, and the visual content may be a VR/AR/MR content corresponding to the reality service provided by the HMD, but the disclosure is not limited thereto.

In the embodiments of the disclosure, before the communication device 100 establishes the communication group, the communication device 100 may select a channel from a plurality of reference channels specified in the specification of the desired communication protocol (e.g., Wi-Fi), and the devices in the communication group may perform transmissions/receptions (e.g., P2P transmissions/receptions) by using the selected channel.

However, if the channel selected by the communication device 100 is congested due to, for example, already being selected by some other devices for establishing their corresponding communication group, the communication quality of the communication group of the communication device 100 may be unsatisfying.

Therefore, the embodiments of the disclosure provide a method for establishing a communication group, which can be performed before in the process of the communication device 100 establishing the communication and used to resolve this problem.

In the embodiments of the disclosure, the processor 104 may access one or more modules and/or program codes to implement the method for establishing a communication group provided in the disclosure, which would be further discussed in the following.

Figure 2:
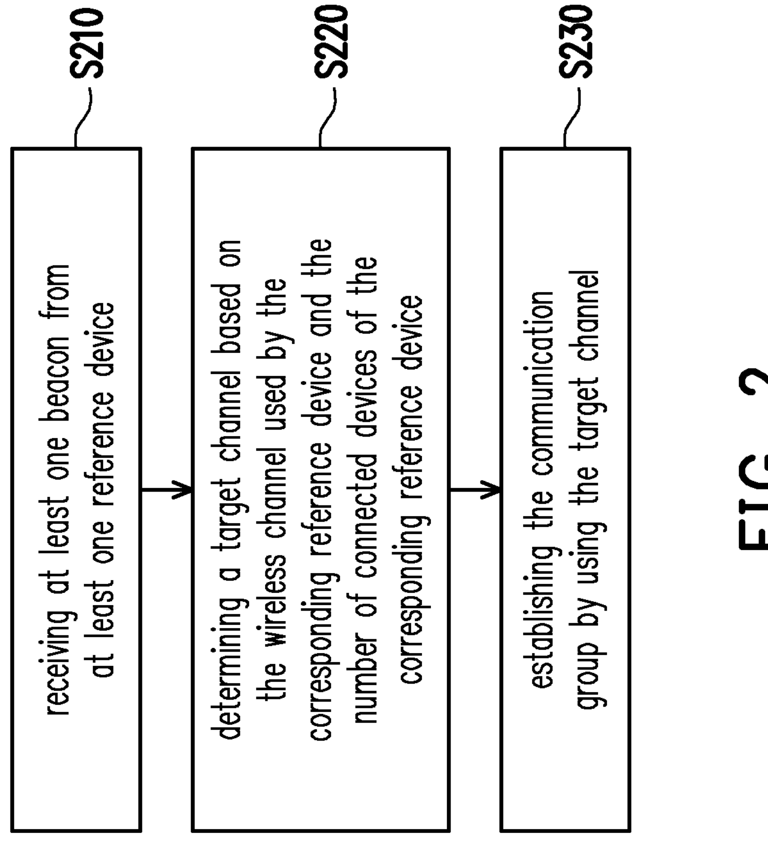
FIG. 2 shows a flow chart of the method for establishing a communication group according to an embodiment of the disclosure.

See FIG. 2, which shows a flow chart of the method for establishing a communication group according to an embodiment of the disclosure. The method of this embodiment may be executed by the communication device 100 in FIG. 1, and the details of each step in FIG. 2 will be described below with the components shown in FIG. 1.

In step S210, the processor 104 controls the transceiver 102 to receive at least one beacon from at least one reference device, wherein each of the at least one beacon includes a wireless channel used by the corresponding reference device and a number of connected devices of the corresponding reference device, and the wireless channel indicated in each of the at least one beacon belongs to the reference channels.

Figure 3:
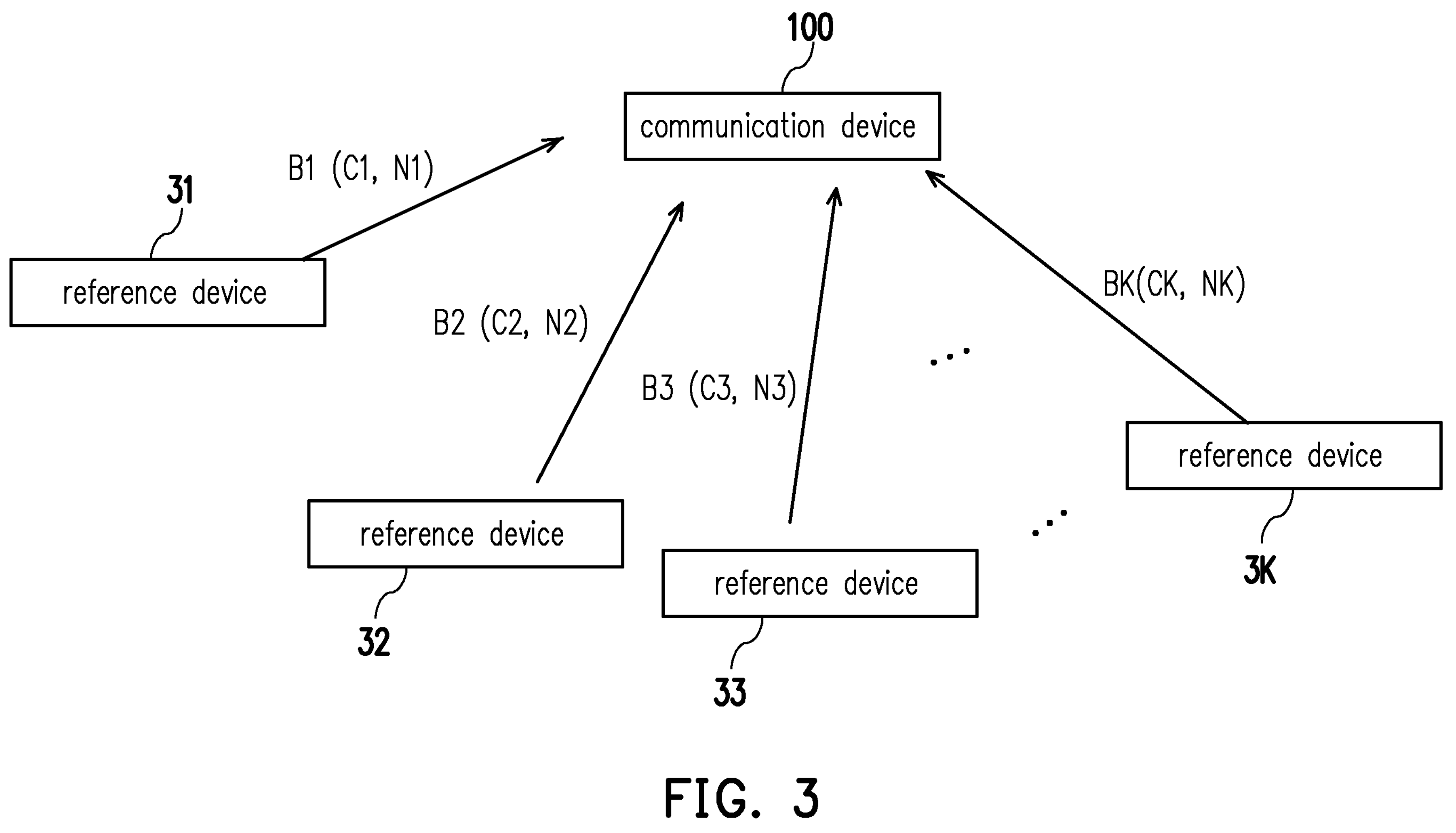
FIG. 3 shows an application scenario according to an embodiment of the disclosure.

For better explaining the concept of the disclosure, FIG. 3 would be used as an example, wherein FIG. 3 shows an application scenario according to an embodiment of the disclosure.

In FIG. 3, each of the reference devices 31-3K can send (e.g., broadcast) the corresponding beacons B1-BK (k is a positive integer), and the processor 104 in the communication device 100 may control the transceiver 102 in the communication device 100 to receive the beacons B1-BK.

In the embodiments of the disclosure, each of the reference devices 31-3K may be a device already established a corresponding communication group. For example, if the communication device 100 intends to establish the corresponding communication group based on a specific protocol (e.g., Wi-Fi), each of the reference devices 31-3K may be a device (e.g., HMD or other communication devices) already established the corresponding communication group (e.g., a private P2P group) based on the same specific protocol.

In addition, the communication device 100 may locate within the transmission coverage of each of the reference devices 31-3K, which means that the transmission/receptions performed by the connected devices in the communication group of the communication device 100 may be interfered by the communication groups corresponding to the reference devices 31-3K, but the disclosure is not limited thereto.

In the embodiments of the disclosure, each of the reference devices 31-3K can communicate with the connected devices in the corresponding communication group by using the wireless channel chosen in the process of establishing the corresponding communication group. For better explaining the concept of the disclosure, the communication groups respectively established by the reference devices 31-3K would be referred to as G1-GK.

In one embodiment, assuming that the reference device 31 chose a wireless channel C1 in the process of establishing the communication group G1, the connected devices (e.g., peripheral devices and/or accessory devices connected with the reference device 31) in the communication group G1 of the reference device 31 may perform transmission/reception by using the wireless channel C1.

In one embodiment, after the reference device 31 establish the communication group G1, the reference device 31 may send (e.g., broadcast) the beacon B1, wherein the beacon B1 may include the wireless channel C1 and the number of connected devices in the communication group G1. For example, assuming that the reference device 31 is an HMD connected with N1 peripheral devices and/or accessory devices, the number of connected devices in the communication group G1 would be N1, and the reference device 31 may use the beacon B1 to carry the information of N1.

In this case, after the communication device 100 receives the beacon B1, the processor 104 can determine that the reference device 31 uses the wireless channel C1 in the communication group G1, and there are N1 connected devices in the communication group G1.

For another example, assuming that the reference device 32 chose a wireless channel C2 in the process of establishing the corresponding communication group, the connected devices (e.g., peripheral devices and/or accessory devices connected with the reference device 32) in the communication group corresponding to the reference device 32 may perform transmission/reception by using the wireless channel C2.

In one embodiment, after the reference device 32 establish the communication group G2, the reference device 32 may send (e.g., broadcast) the beacon B2, wherein the beacon B2 may include the wireless channel C2 and the number of connected devices in the communication group G2. For example, assuming that the reference device 32 is an HMD connected with N2 peripheral devices and/or accessory devices, the number of connected devices in the communication group G2 would be N2, and the reference device 32 may use the beacon B2 to carry the information of N2.

In this case, after the communication device 100 receives the beacon B2, the processor 104 can determine that the reference device 32 uses the wireless channel C2 in the communication group G2, and there are N2 connected devices in the communication group G2.

For another example, assuming that the reference device 33 chose a wireless channel C3 in the process of establishing the corresponding communication group, the connected devices (e.g., peripheral devices and/or accessory devices connected with the reference device 33) in the communication group corresponding to the reference device 33 may perform transmission/reception by using the wireless channel C3.

In one embodiment, after the reference device 33 establish the communication group G3, the reference device 33 may send (e.g., broadcast) the beacon B3, wherein the beacon B3 may include the wireless channel C3 and the number of connected devices in the communication group G3. For example, assuming that the reference device 33 is an HMD connected with N3 peripheral devices and/or accessory devices, the number of connected devices in the communication group G3 would be N3, and the reference device 33 may use the beacon B3 to carry the information of N3.

In this case, after the communication device 100 receives the beacon B3, the processor 104 can determine that the reference device 33 uses the wireless channel C3 in the communication group G3, and there are N3 connected devices in the communication group G3.

For another example, assuming that the reference device 3K chose a wireless channel CK in the process of establishing the corresponding communication group, the connected devices (e.g., peripheral devices and/or accessory devices connected with the reference device 3K) in the communication group corresponding to the reference device 3K may perform transmission/reception by using the wireless channel CK.

In one embodiment, after the reference device 3K establish the communication group GK, the reference device 3K may send (e.g., broadcast) the beacon BK, wherein the beacon BK may include the wireless channel CK and the number of connected devices in the communication group GK. For example, assuming that the reference device 3K is an HMD connected with NK peripheral devices and/or accessory devices, the number of connected devices in the communication group GK would be NK, and the reference device 3K may use the beacon BK to carry the information of NK.

In this case, after the communication device 100 receives the beacon BK, the processor 104 can determine that the reference device 3K uses the wireless channel CK in the communication group GK, and there are NK connected devices in the communication group GK.

In the embodiments of the disclosure, one of the wireless channels C1, C2, . . . , CK can be the same as or different from another of the wireless channels C1, C2, . . . , CK. That is, it is possible for some of the reference devices 31-3K to use the same wireless channel in the respective communication group.

In step S220, the processor 104 determines a target channel based on the wireless channel used by the corresponding reference device and the number of connected devices of the corresponding reference device.

In one embodiment, step S220 can be implemented to determine the target channel via the mechanism introduced later in FIG. 4. Afterwards, in step S230, the processor 104 establishes the communication group by using the target channel.

See FIG. 4, which shows a flow chart of determining a target channel according to an embodiment of the disclosure. In FIG. 4, the processor 104 can perform steps S420-S490 after step S210, and the details thereof would be discussed in the following.

In step S420, the processor 104 determines whether the plurality of reference channels include a plurality of least used channels based on the wireless channel indicated in each of the at least one beacon.

In the scenario of FIG. 3, the processor 104 may determine how many times each reference channel has been reused based on the wireless channel indicated in each of the beacons B1-BK. For example, if three of the reference devices 31-3K use a first reference channel among the reference channels as the wireless channel of the corresponding communication groups, the processor 104 may determine that the first reference channel has been reused for three times. For another example, if another four of the reference devices 31-3K use a second reference channel among the reference channels as the wireless channel of the corresponding communication groups, the processor 104 may determine that the second reference channel has been reused for four times.

Accordingly, the processor 104 may determine the least used channel(s) among the reference channels based on the times each reference channel has been reused.

In one embodiment, if only one of the reference channels is determined to have a lowest reused times, the processor 104 may determine that the reference channels include only one least used channel. For example, assuming that only the first reference channel is determined to have the lowest reused time, the processor 104 may determine that the reference channels include only one least used channel, which is the first reference channel.

In another embodiment, if there are two or more of the reference channels are determined to have the same lowest reused times, the processor 104 may determine that the reference channels include a plurality of least used channels. For example, assuming that the first reference channel and the second reference channel are determined to have the same lowest reused time, the processor 104 may determine that the reference channels include a plurality of least used channels, which are the first reference channel and the second reference channel, but the disclosure is not limited thereto.

In a first embodiment, in response to determining that the plurality of reference channels include the plurality of least used channels, the processor 104 may subsequently perform step S430. On the other hand, in a second embodiment, in response to determining that the plurality of reference channels include only one of least used channel, the processor 104 may subsequently perform step S460.

In step S460, the processor 104 determines the one least used channel as the target channel. In this case, the processor

104 may subsequently perform step S230 via establishing the communication group by using the one least used channel.

For example, in the case where only the first reference channel is determined to have the lowest reused times, the processor 104 may determine the first reference channel as the one least used channel considered in step S460, and the processor 104 may subsequently use the first reference channel to establish the communication group in step S230, wherein the communication device 100 can be regarded as the communication hotspot managing the established communication group, but the disclosure is not limited thereto. In this case, the connected devices in the communication group established by the communication device 100 may use the first reference channel to perform transmissions/receptions with the communication device 100, but the disclosure is not limited thereto.

In the second embodiment, since the communication device 100 can be understood as using the channel with least interference to communicate with the connected devices in the communication group established by the communication device 100, the throughput of the communication group can be guaranteed.

In step S430, the processor 104 determines a number of total connected devices corresponding to each of the plurality of least used channels based on the number of connected devices indicated in each of the at least one beacon.

For better explaining, it is assumed that the plurality of least used channels in the first embodiment include a first least used channel (e.g., the first reference channel) and a second least used channel (e.g., the second reference channel). In addition, the reference devices 31 and 32 are assumed to use the first least used channel as the wireless channels C1 and C2, and the reference devices 33 and 3K are assumed to use the second least used channel as the wireless channels C3 and CK. That is, the reused times of each of the first least used channel and the second least used channel is two, but the disclosure is not limited thereto.

In the first embodiment, the processor 104 may summing the number of connected devices corresponding to the first least used channel as the number of total connected devices corresponding to the first least used channel. Likewise, the processor 104 may summing the number of connected devices corresponding to the second least used channel as the number of total connected devices corresponding to the second least used channel.

In the above assumption, the number of connected devices corresponding to the first least used channel may be the number of connected devices of the reference device 31 (e.g., N1) and the number of connected devices of the reference device 32 (e.g., N2). In this case, the processor 104 may sum N1 and N2 as the number of total connected devices corresponding to the first least used channel.

In addition, the number of connected devices corresponding to the second least used channel may be the number of connected devices of the reference device 33 (e.g., N3) and the number of connected devices of the reference device 3K (e.g., NK). In this case, the processor 104 may sum N3 and NK as the number of total connected devices corresponding to the second least used channel.

In step S440, the processor 104 determines whether the plurality of least used channels include only one least connected channel based on the number of total connected devices corresponding to each of the plurality of least used channels.

In one embodiment, if only one of the least used channels is determined to have a lowest number of total connected devices, the processor 104 may determine that the reference channels include only one least connected channel. For example, assuming that only the first least used channel is determined to have the lowest number of total connected devices (e.g., the sum of N1 and N2 is smaller than the sum of N3 and NK), the processor 104 may determine that the least used channels include only one least connected channel, which is the first least used channel.

In another embodiment, if there are two or more of the least used channels are determined to have the same lowest number of total connected devices, the processor 104 may determine that the least used channels include a plurality of least connected channels. For example, assuming that the first least used channel and the second least used channel are determined to have the same lowest number of total connected devices (e.g., the sum of N1 and N2 is equal to the sum of N3 and NK), the processor 104 may determine that the least used channels include a plurality of least connected channels, which are the first least used channel and the second least used channel, but the disclosure is not limited thereto.

In a third embodiment, in response to determining that the plurality of least used channels include only one least connected channel, the processor 104 may subsequently perform step S450. On the other hand, in a fourth embodiment, in response to determining that the plurality of least used channels include a plurality of least connected channels, the processor 104 may subsequently perform step S470.

In step S450, the processor 104 determines the one least connected channel as the target channel. In this case, the processor 104 may subsequently perform step S230 via establishing the communication group by using the one least connected channel. For example, in the case where only the first reference channel is determined to be the least used channel having the lowest number of total connected devices, the processor 104 may determine the first reference channel as the least connected channel considered in step S450, and the processor 104 may subsequently use the first reference channel to establish the communication group in step S230, wherein the communication device 100 can be regarded as the communication hotspot managing the established communication group, but the disclosure is not limited thereto. In this case, the connected devices in the communication group established by the communication device 100 may use the first reference channel to perform transmissions/receptions with the communication device 100, but the disclosure is not limited thereto.

In the third embodiment, since the communication device 100 can be understood as using the channel with least interference to communicate with the connected devices in the communication group established by the communication device 100, the throughput of the communication group can be guaranteed.

In step S470, the processor 204 determines a channel quality corresponding to each of the plurality of least connected channels. In one embodiment, the processor 104 determines the channel quality of each of the plurality of least connected channels via measuring a received signal strength indicator (RSSI) of the corresponding beacon.

For simplifying the discussions, the first reference channel and the second reference channel may be assumed to be the least connected channels considered in step S470, but the disclosure is not limited thereto. In this case, the processor 104 may determine the channel quality of each of the first reference channel and the second reference channel via measuring the RSSI of the corresponding beacon.

Based on the assumption in the above, the reference devices 31 and 32 use the first least used channel as the wireless channels C1 and C2, and the reference devices 33 and 3K use the second least used channel as the wireless channels C3 and CK. In the case, the beacon corresponding to the first reference channel may be the beacons B1 and B2 that respectively indicates the wireless channels C1 and C2, and the beacon corresponding to the second reference channel may be the beacons B3 and BK that respectively indicates the wireless channels C3 and CK, but the disclosure is not limited thereto.

In one embodiment, the processor 104 may measure the RSSI of receiving each of the beacons B1 and B2 and determine the average RSSI thereof as the RSSI corresponding to the first reference channel, i.e., the channel quality corresponding to the first reference channel.

Similarly, the processor 104 may measure the RSSI of receiving each of the beacons B3 and BK and determine the average RSSI thereof as the RSSI corresponding to the second reference channel, i.e., the channel quality corresponding to the second reference channel, but the disclosure is not limited thereto.

In step S480, the processor 104 determines, among the plurality of least connected channels, a specific channel based on the channel quality corresponding to each of the plurality of least connected channels, wherein the channel quality of the specific channel is the best among the plurality of least connected channels.

Continuing with the above assumption, if the channel quality corresponding to the first reference channel is better than the channel quality corresponding to the second reference channel (i.e., the channel quality of the first reference channel is the best among the plurality of least connected channels), the processor 104 may determine the first reference channel as the specific channel considered in step S480. On the other hand, if the channel quality corresponding to the second reference channel is better than the channel quality corresponding to the first reference channel (i.e., the channel quality of the second reference channel is the best among the plurality of least connected channels), the processor 104 may determine the second reference channel as the specific channel considered in step S480, but the disclosure is not limited thereto.

In step S490, the processor 104 determines the specific channel as the target channel. In this case, the processor 104 may subsequently perform step S230 via establishing the communication group by using the specific channel, wherein the communication device 100 can be regarded as the communication hotspot managing the established communication group, but the disclosure is not limited thereto. In this case, the connected devices in the communication group established by the communication device 100 may use the specific channel to perform transmissions/receptions with the communication device 100, but the disclosure is not limited thereto.

In the fourth embodiment, since the communication device 100 can be understood as using the channel with least interference to communicate with the connected devices in the communication group established by the communication device 100, the throughput of the communication group can be guaranteed.

In one embodiment, each of the beacons B1-BK can be transmitted based on a first communication protocol, and the communication group established by the communication device 100 may be established based on a second communication protocol. In one embodiment, the first communication protocol may be the same as the second communication protocol.

In another embodiment, the first communication protocol may be different from the second communication protocol. For example, the first communication protocol may be one of Bluetooth and Wi-fi, and the second communication protocol may be another of Bluetooth and Wi-fi, but the disclosure is not limited thereto.

In one embodiment, after the communication device 100 establishes the communication group thereof, the communication device 100 may also send (e.g., broadcast) a reference beacon, wherein the reference beacon indicates at least one of the target channel used for establishing the communication group and a reference number of connected device in the communication group, wherein the reference number of connected device in the communication group is a number of devices connected with the communication device 100. That is, after the communication device 100 establishes the communication group thereof, the communication device 100 may also send (e.g., broadcast) its own beacon, wherein this beacon may indicate the target channel used in the communication group of the communication device 100 and/or the number of the connected devices in the communication group of the communication device 100, but the disclosure is not limited thereto.

For example, if the communication device 100 is connected with M devices (e.g., peripheral devices, handheld controllers, wearable devices or the like, and M is an integer) and determines to use the first reference channel as the target channel to establish the communication group, the M devices and the communication device 100 may perform communications with each other by using the first reference channel. In this case, the communication device 100 may send the reference beacon, and the reference beacon may indicate the target channel (e.g., the first reference channel) and M, but the disclosure is not limited thereto.

Accordingly, other communication devices intending to establish their own communication groups may properly select the corresponding target channel based on the beacons B1-BK and the reference beacon by using the mechanisms described in FIG. 2 and FIG. 4, but the disclosure is not limited thereto.

The disclosure further provides a computer readable storage medium for executing the method for establishing a communication group. The computer readable storage medium is composed of a plurality of program instructions (for example, a setting program instruction and a deployment program instruction) embodied therein. These program instructions can be loaded into the communication device 100 and executed by the same to execute the method for establishing a communication group and the functions of the communication device 100 described above.

In summary, the embodiments of the disclosure provide a solution for the communication device to select a channel with least interference among the reference channels and accordingly establish a communication group (e.g., a private P2P Wi-Fi group). In this case, the connected devices in the communication group established by the communication device can perform transmission/receptions (e.g., P2P transmissions/receptions) with low interference which improves the throughput of the communication group.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for establishing a communication group, applied to a communication device, comprising:

receiving, by the communication device, at least one beacon from at least one reference device, wherein each of the at least one beacon comprises a wireless channel used by the corresponding reference device and a number of connected devices of the corresponding reference device, and the wireless channel indicated in each of the at least one beacon belongs to a plurality of reference channels;

determining, by the communication device, a target channel based on the wireless channel used by the corresponding reference device and the number of connected devices of the corresponding reference device; and establishing, by the communication device, the communication group by using the target channel, wherein determining the target channel based on the wireless channel used by the corresponding reference device and the number of connected devices of the corresponding reference device comprises:

determining whether the plurality of reference channels comprise a plurality of least used channels based on the wireless channel indicated in each of the at least one beacon;

in response to determining that the plurality of reference channels comprise the plurality of least used channels, determining a number of total connected devices corresponding to each of the plurality of least used channels based on the number of connected devices indicated in each of the at least one beacon;

determining whether the plurality of least used channels comprise only one least connected channel based on the number of total connected devices corresponding to each of the plurality of least used channels;

in response to determining that the plurality of least used channels comprise only one least connected channel, determining the only one least connected channel as the target channel.

2. The method according to claim 1, further comprising:

in response to determining that the plurality of reference channels comprise only one least used channel, determining the one least used channel as the target channel.

3. The method according to claim 1, further comprising:

in response to determining that the plurality of least used channels comprise a plurality of least connected channels, determining a channel quality corresponding to each of the plurality of least connected channels;

determining, among the plurality of least connected channels, a specific channel based on the channel quality corresponding to each of the plurality of least connected channels, wherein the channel quality of the specific channel is the best among the plurality of least connected channels; and determining the specific channel as the target channel.

4. The method according to claim 3, wherein determining the channel quality corresponding to each of the plurality of least connected channels comprises:

determining the channel quality of each of the plurality of least connected channels via measuring a received signal strength indicator of the corresponding beacon.

5. The method according to claim 1, wherein the plurality of least used channels comprise a first least used channel, and determining the number of total connected devices corresponding to each of the plurality of least used channels based on the number of connected devices indicated in each of the at least one beacon comprises:

summing the number of connected devices corresponding to the first least used channel as the number of total connected devices corresponding to the first least used channel.

6. The method according to claim 1, wherein the at least one beacon is transmitted based on a first communication protocol, and the communication group established by the communication device is established based on a second communication protocol.

7. The method according to claim 6, wherein the first communication protocol is one of Bluetooth and Wi-fi, and the second communication protocol is another of Bluetooth and Wi-fi.

8. The method according to claim 1, wherein after establishing the communication group by using the target channel, the method further comprises:

sending a reference beacon, wherein the reference beacon indicates at least one of the target channel used for establishing the communication group and a reference number of connected device in the communication group, wherein the reference number of connected device in the communication group is a number of devices connected with the communication device.

9. The method according to claim 1, wherein the communication device is a head-mounted display.

10. A communication device, comprising:

a transceiver; and a processor, coupled to the transceiver and performing:

controlling the transceiver to receive at least one beacon from at least one reference device, wherein each of the at least one beacon comprises a wireless channel used by the corresponding reference device and a number of connected devices of the corresponding reference device, and the wireless channel indicated in each of the at least one beacon belongs to a plurality of reference channels;

determining a target channel based on the wireless channel used by the corresponding reference device and the number of connected devices of the corresponding reference device; and establishing the communication group by using the target channel, wherein the processor performs:

determining whether the plurality of reference channels comprise a plurality of least used channels based on the wireless channel indicated in each of the at least one beacon;

in response to determining that the plurality of reference channels comprise the plurality of least used channels, determining a number of total connected devices corresponding to each of the plurality of least used channels based on the number of connected devices indicated in each of the at least one beacon;

determining whether the plurality of least used channels comprise only one least connected channel based on the number of total connected devices corresponding to each of the plurality of least used channels;

in response to determining that the plurality of least used channels comprise only one least connected channel, determining the only one least connected channel as the target channel.

11. The communication device according to claim 10, wherein the processor further performs:

in response to determining that the plurality of reference channels comprise only one least used channel, determining the one least used channel as the target channel.

12. The communication device according to claim 10, wherein the processor further performs:

in response to determining that the plurality of least used channels comprise a plurality of least connected channels, determining a channel quality corresponding to each of the plurality of least connected channels;

determining, among the plurality of least connected channels, a specific channel based on the channel quality corresponding to each of the plurality of least connected channels, wherein the channel quality of the specific channel is the best among the plurality of least connected channels; and determining the specific channel as the target channel.

13. The communication device according to claim 12, wherein the processor performs:

determining the channel quality of each of the plurality of least connected channels via measuring a received signal strength indicator of the corresponding beacon.

14. The communication device according to claim 10, wherein the plurality of least used channels comprise a first least used channel, and the processor performs:

summing the number of connected devices corresponding to the first least used channel as the number of total connected devices corresponding to the first least used channel.

15. The communication device according to claim 10, wherein the at least one beacon is transmitted based on a first communication protocol, and the communication group established by the communication device is established based on a second communication protocol.

16. The communication device according to claim 15, wherein the first communication protocol is one of Bluetooth and Wi-fi, and the second communication protocol is another of Bluetooth and Wi-fi.

17. The method according to claim 10, wherein after establishing the communication group by using the target channel, the processor further performs:

sending a reference beacon, wherein the reference beacon indicates at least one of the target channel used for establishing the communication group and a reference number of connected device in the communication group, wherein the reference number of connected device in the communication group is a number of devices connected with the communication device.

18. A non-transitory computer readable storage medium, the computer readable storage medium recording an executable computer program, the executable computer program being loaded by a communication device to perform steps of:

receiving at least one beacon from at least one reference device, wherein each of the at least one beacon comprises a wireless channel used by the corresponding reference device and a number of connected devices of the corresponding reference device, and the wireless channel indicated in each of the at least one beacon belongs to a plurality of reference channels;

determining a target channel based on the wireless channel used by the corresponding reference device and the number of connected devices of the corresponding reference device; and establishing the communication group by using the target channel, wherein the step of determining the target channel based on the wireless channel used by the corresponding reference device and the number of connected devices of the corresponding reference device comprises:

determining whether the plurality of reference channels comprise a plurality of least used channels based on the wireless channel indicated in each of the at least one beacon;

in response to determining that the plurality of reference channels comprise the plurality of least used channels, determining a number of total connected devices corresponding to each of the plurality of least used channels based on the number of connected devices indicated in each of the at least one beacon;

determining whether the plurality of least used channels comprise only one least connected channel based on the number of total connected devices corresponding to each of the plurality of least used channels;

in response to determining that the plurality of least used channels comprise only one least connected channel, determining the only one least connected channel as the target channel.

* * * * *